March 1, 1966          J. A. STEWART          3,237,972
                       ACCOUNTING BOARD
                       Filed July 7, 1964
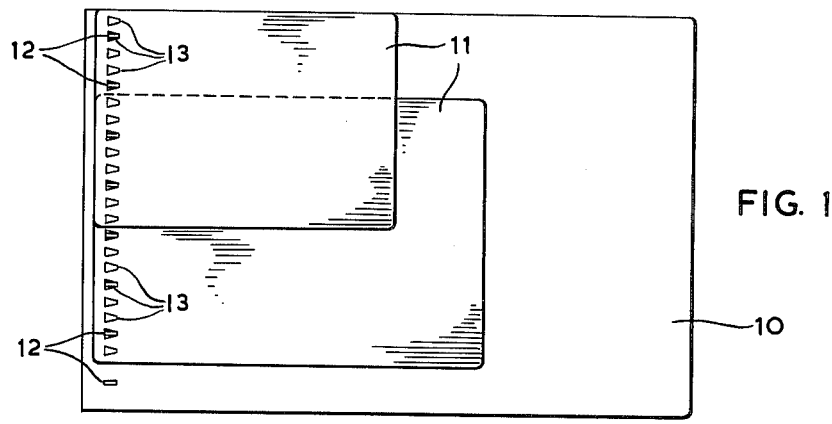
FIG. 1
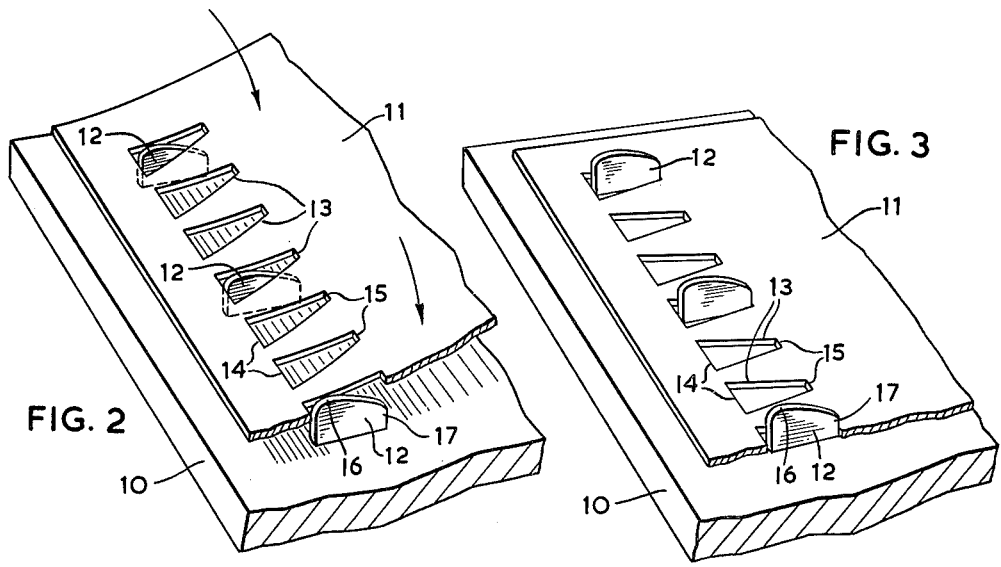
FIG. 2
FIG. 3
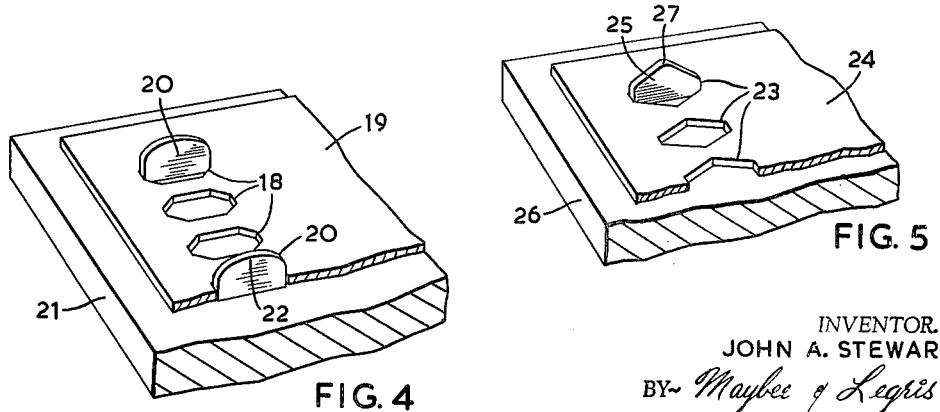
FIG. 4
FIG. 5
INVENTOR.
JOHN A. STEWART
BY Maybee & Legris
ATTORNEYS United States Patent Office 3,237,972
Patented Mar. 1, 1966

3,237,972
ACCOUNTING BOARD
John A. Stewart, Weston, Ontario, Canada, assignor to Visirecord of Canada Limited, Toronto, Ontario, Canada
Filed July 7, 1964, Ser. No. 380,874
6 Claims. (Cl. 282—29)

This invention relates to improved accounting devices and more particularly to a novel combination of a supporting peg board and accounting sheets fitting thereon used in accounting practices.

It has become very common in certain accounting systems to use a peg board upon which a number of accounting sheets are placed and which serves not only as a writing board but also as a device for holding the sheets in a desired position. Heretofore, accounting sheets have been used with circular or oblong holes in combination with pegs on support boards with the holes in the sheets having substantially the same shape and size in the plane of the board as the pegs upon which they are fitted. Although by this procedure a very firm fit is provided for the record sheets, there has always been considerable difficulty involved with the initial fitting of the sheets on the pegs and then the removal of the sheets therefrom after the accounting operation has been completed. The fitting and removing operations, then, waste a considerable amount of time and cut down on efficiency.

The combination of accounting board and accounting sheets described hereinafter with flat pegs easily and quickly fitting into specially shaped holes in the sheets permits the placing of the accounting sheets on and the removal of the sheets from the board in an efficient and time saving manner.

It is an object of the present invention to provide an accounting board with attachable accounting sheets which allows faster and more efficient operation of the board in adding sheets thereto and removing sheets therefrom.

Another object of the invention is to provide a novel combination of accounting peg board and sheets fitting thereon which is very simple to operate, inexpensive to manufacture and which is efficiently and rapidly adjustable in performing accounting operations.

Other objects and advantages of the invention will be apparent from the following description taken in conjunction with the accompanying drawing in which:

FIGURE 1 is a plan view of a preferred form of accounting board device embodying the invention;

FIGURE 2 is an enlarged, perspective view of a broken-away portion of the device shown in FIGURE 1, with an accounting sheet being placed on the board;

FIGURE 3 depicts a perspective view of the broken-away portion shown in FIGURE 2, with an accounting sheet fully placed on the board;

FIGURE 4 shows a perspective view of a broken-away portion of another form of accounting board and sheet device embodying the invention; and FIGURE 5 is a perspective view of a further form of combination of accounting board and sheets fitting thereon embodying the invention.

The present invention relates to a combination of an accounting peg board and accounting sheets containing a row of holes and adapted to be fitted over the pegs on the board. Each peg has a substantially elongated configuration in the plane of the board and has a raised first portion and a lower second portion therein. Each hole in the accounting sheets is shaped to have a portion therein wider than the pegs in the accounting board and a narrower portion of substantially the same width as the lower portion of the pegs. The configurations of each hole in the accounting sheets and the pegs are such that the wide portion of a hole is located to be received by the raised portion of a peg and the narrow portion of a hole is located to be received by the lower portion of a peg, with the pegs fitting snugly in the holes and the accounting sheets being held substantially rigidly in the plane of the board when fully placed thereon.

Referring to the drawing, and in particular to FIGURE 1, which illustrates a preferred form of combination of accounting board and accounting sheets embodying the invention, an accounting peg board 10 is shown providing a support board with a substantially flat surface for accounting sheets 11 placed thereon. The accounting sheets 11, which may be for the accounts payable journal, the accounts receivable ledger, the cash receipts journal or other sheets for other journals and ledgers, are seen to fit onto flat, elongated pegs 12 attached to the board 10. A series of receiving holes 13 in the sheets 11 are shown fitting over the pegs 12. In the embodiment shown in FIGURE 1 the pegs 12 are spaced so as to fit into every third hole in the accounting sheets 11, but closer or wider spacing of the pegs 12 can, of course, be arranged on the board 10. Also, although FIGURE 1 shows one row of pegs with one row of holes in the sheets, a second or more rows of pegs can be utilized on the board with corresponding rows of holes in the accounting sheets where required.

FIGURE 2 shows, in an enlarged, perspective view, a broken-away portion of the accounting board 10, shown in FIGURE 1, with one of the accounting sheets 11 being placed thereon over the pegs 12. FIGURE 3 shows another perspective view of the broken-away portion of the board 10 shown in FIGURE 2 with the accounting sheet 11 fully placed thereon. As can be seen from viewing FIGURES 2 and 3, the receiving holes 13 in the accounting sheet 11 are truncated triangles wider along end 14 than along end 15 with their bases parallel to the margin edges of the sheet. The pegs 12, which are attached to the board 10, are of a flat configuration and are elongated in the plane of the board. The pegs 12 are substantially the same length as the holes 13 to fit lengthwise therein and are seen to have a raised portion 16 which is so arranged in conjunction with the wider end 14 in the holes 13 to mate with this wider portion upon proper placement of the sheet 11 on the board 10. Lower end portion 17 of the pegs 12 and the narrower end 15 of the holes 13 are adapted to be of substantially the same width so that the end portion 17 of the pegs 12 has a substantially snug fit in the narrow end portion 15 of the holes 13. When the sheet 11 is fully fitted onto the board 10 over the pegs 12, it is seen to be held substantially rigidly in place by the snug fit of the pegs 12 in the holes 13.

It can be seen from this novel combination of accounting peg boards and sheets, and from viewing FIGURES 2 and 3, that the pegs on the board are very readily and quickly located in the holes in the accounting sheets since the raised portion of the narrow peg passes into the wide portion of the holes in the accounting sheets without the need for any precise fitting as has been necessary with sheets and boards heretofore used in the art. Once located, the sheets are easily pressed over the pegs on the board and form a snug fit thereon. The novel combination of sheet and board described herein not only saves time and improves efficiency in placing sheets on and removing sheets from the peg board, but also reduces wastage caused by improper placing of sheets and by too hasty removal of sheets whereby they are torn and otherwise mutilated.

Although in the embodiment of the invention described in conjunction with FIGURES 1, 2 and 3 of the drawing the holes in the accounting sheets are shown to be truncated triangles with the raised portion of the pegs in the accounting peg board being located at one end of the peg to coincide with the wider portion of the hole, other combinations of shapes of holes and pegs can be used to carry out the objects of the invention and FIGURES 4 and 5 of the drawing depict perspective views of broken-away portions of other such combinations embodying the invention. Thus, in FIGURE 4 six-sided elongated holes 18 in accounting sheet 19 are shown with the holes truncated at each end and the wider portion of each hole located centrally therein. Elongated, substantially flat pegs 20 are shown in peg board 21 with a raised portion 22 located centrally in the peg to coincide with the centrally located wider portion in the hole 18 in the accounting sheet 19. The sheet 19 is seen to fit snugly over the pegs 22. In FIGURE 5 a diamond-shaped hole 23, truncated at each end, is shown in accounting sheet 24 with an elongated peg 25 in peg board 26 fitting into the hole 23. The peg 25 is also shown with a raised portion 27 centrally located in the peg 25 to coincide with the wide portion of the hole 23. The hole 23 and the peg 25 are so adapted to that accounting sheet 24 sits snugly around the peg 25 when fully placed on the board 26.

Other shapes and sizes of holes in accounting sheets and pegs in peg boards can be utilized such that in any combination of pegs and holes the holes in the sheets have a portion therein wider than the pegs in the boards and located to be received by a raised portion of the pegs, with a narrower portion or portions of the accounting sheet holes being substantially the same width as the lower portion or portions of the pegs. In each case the holes and pegs are so adapted that the pegs provide a snug, retaining fit for an accounting sheet when it is fully placed on the broad. Thus, for example, a diamond-shaped hole in accounting sheets, possibly truncated at one or both ends and with the wide portion offset towards one end, can be used in conjunction with a flat peg, fitting therein, with an offset, raised central portion. Also, a hole in accounting sheets with two wide portions therein can be used in combination with a substantially flat peg with two raised portions therein fitting into the two wide portions in the holes in the accounting sheets.

It is to be noted that, although the invention has been described in conjunction with the drawing with reference to one row of pegs in the support board with one row of holes in accounting sheets fitting thereon, two or more rows or pegs may be used on a board, where required, in combination with accounting sheets having one or more rows of holes therein.

What I claim as my invention is:

1. The combination of an accounting pegboard and accounting sheets fitting thereon which comprises a support board having a substantially flat surface, at least one row of evenly spaced pegs projecting from the board and fixed therein, each peg being substantially flat, having an elongated configuration in the plane of the board and having a raised portion and a lower portion therein, said raised portion being in spaced relationship from said lower portion, and accounting sheets with at least one row of equally spaced holes therein adapted to be fitted onto the row of evenly spaced pegs, each of the holes in the accounting sheets having a wide portion therein substantially wider than each said peg and located to be received by the raised portion of said peg and a narrow portion therein of substantially the same width as the lower portion in said peg and located to be received by said lower portion and the pegs and holes being so adapted to provide a snug fit of pegs in holes and to hold said accounting sheets substantially rigidly in the plane of the board.

2. The combination of an accounting pegboard and accounting sheets fitting thereon which comprises a support board having a substantially flat surface, at least one row of evenly spaced pegs projecting from the board and fixed therein, each peg being substantially flat, having an elongated configuration in the plane of the board and having a raised portion located at one end and a lower portion located at the opposite end thereof, and accounting sheets with at least one row of equally spaced holes therein adapted to be fitted onto the row of evenly spaced pegs, each of the holes in the accounting sheets having a wide portion at one side thereof substantially wider than each said peg and located to be received by the raised portion of said peg and a narrow portion at the opposite side thereof of substantially the same width as the lower portion in said peg and located to be received by said lower portion, and the pegs and holes being so adapted to provide a snug fit of pegs in holes and to hold said accounting sheets substantially rigidly in the plane of the board.

3. The combination of an accounting pegboard and accounting sheets fitting thereon which comprises a support board having a substantially flat surface, at least one row of evenly spaced pegs projecting from the board and fixed therein, each peg being substantially flat, having an elongated configuration in the plane of the board and having a raised portion located at one end and a lower portion located at the opposite end thereof, and accounting sheets with at least one row of equally spaced holes therein adapted to be fitted onto the row of evenly spaced pegs, each of the holes in the accounting sheets being the shape of a truncated triangle with the base of the triangle opposite the truncated portion thereof being parallel to the margin side of the sheets and being substantially wider than each said peg and located to be received by the raised portion of said peg and the truncated portion of the triangle being of substantially the same width as the lower portion in said peg and located to be received by said lower portion, and the pegs and holes being so adapted to provide a snug fit of pegs in holes and to hold said accounting sheets substantially rigidly in the plane of the board.

4. In an accounting pegboard and accounting sheet device the combination of a support board, a row of pegs in said board and accounting sheets with a row of holes therein adapted to be fitted over the row of pegs, each peg having a substantially elongated configuration in the plane of the board with a raised first portion and lower second portion therein, the holes in the accounting sheets each having a wide portion therein wider than the pegs and located to be received by the raised first portion of each said peg and a narrower portion therein of substantially the same width as the lower second portion of each said peg and located to be received by said second portion, and the pegs being adapted to fit snugly in said holes.

5. In an accounting pegboard and accounting sheet device the combination of a support board having a substantially flat surface, a row of evenly spaced pegs in said board and accounting sheets with a row of holes equally spaced therein adapted to be fitted over the row of pegs, each peg having a substantially elongated configuration in the plane of the board with a raised first portion located at one end and a lower second portion located at the opposite end thereof, the holes in the accounting sheets each having a wide portion therein wider than the pegs and located to be received by the raised first portion of each said peg and a narrower portion therein of substantially the same width as the lower second portion of each said peg and located to be received by said second portion, and the pegs being adapted to fit snugly in said holes.

6. An accounting peg board and accounting sheet device as claimed in claim 5 wherein the holes in the accounting sheets are truncated triangles with their bases opposite the truncated portion parallel to the margin edge of the sheets.

References Cited by the Examiner

UNITED STATES PATENTS

| | | | |
|---|---|---|---|
| 1,471,288 | 10/1923 | Sherman | 282—21.4 |
| 2,277,693 | 3/1942 | Dybvig | 226—87 X |
| 2,319,282 | 5/1943 | Woolf | 226—87 X |
| 3,084,956 | 4/1963 | Nelson | 282—29.2 |

FOREIGN PATENTS 639,647  3/1928  France.

EUGENE R. CAPOZIO, *Primary Examiner.*